United States Patent [19]
Berger et al.

[11] Patent Number: 5,529,598
[45] Date of Patent: Jun. 25, 1996

[54] BOTTOM ANODE FOR A METALLURGICAL VESSEL

[75] Inventors: Harald Berger; Peter Mittag, both of Linz; Johannes Steins, Gallneukirchen, all of Austria

[73] Assignee: Voest-Alpine Industrieanlagenbau GmbH, Austria

[21] Appl. No.: 374,804

[22] Filed: Jan. 19, 1995

[30] Foreign Application Priority Data

Feb. 3, 1994 [AT] Austria ................................. 206/94

[51] Int. Cl.⁶ .................................................. B23K 35/00
[52] U.S. Cl. ........................ 75/10.23; 266/217; 266/220; 75/10.59
[58] Field of Search .................................... 266/217, 216, 266/220, 242; 75/10.23, 10.59; 373/81, 82, 93, 94, 96, 108

[56] References Cited

U.S. PATENT DOCUMENTS 4,564,950  1/1986  Buhler ........................... 373/108

5,233,625  8/1993  Hofmann et al. ............... 373/94
5,410,566  4/1994  Steins et al. .................... 373/82

FOREIGN PATENT DOCUMENTS 0133925  7/1984  European Pat. Off. .
0527363  7/1992  European Pat. Off. .
3835785  3/1989  Germany .

*Primary Examiner*—Scott Kastler
*Attorney, Agent, or Firm*—Ostrolenk, Faber, Gerb & Soffen

[57] ABSTRACT

A bottom anode for a metallurgical vessel destined for producing a metal melt is formed by a metal bar provided with at least one through recess extending from outside of the metallurgical vessel as far as to within the metallurgical vessel. In order to substantially increase the service life of such a bottom anode, conforming it to that of a lining made of refractory material, the bottom anode, on the vessel internal-side end of the metal bar, is provided with a nose formed of metal melt produced within the vessel. The nose incorporates channels departing from the vessel internal-side end of the through recess of the metal bar, which is connected to a supply duct introducing liquid and/or solid hydrocarbons, and at least some of the channels reaching as far as the surface of the nose.

19 Claims, 1 Drawing Sheet

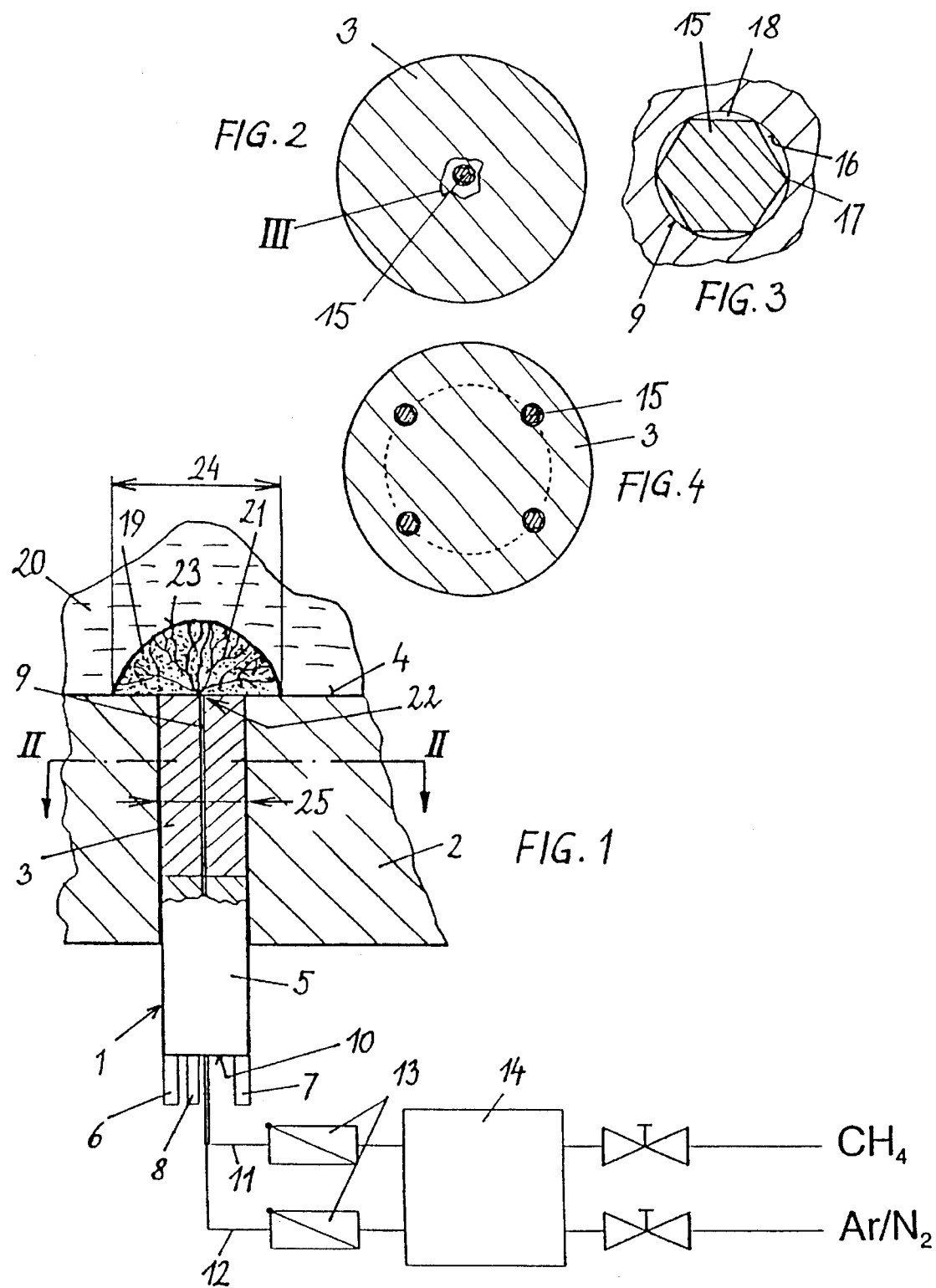

BOTTOM ANODE FOR A METALLURGICAL VESSEL

BACKGROUND OF THE INVENTION

1. Field of the Invention

The invention relates to a bottom anode for a metallurgical vessel destined for producing a metal melt, preferably a steel melt, which bottom anode is formed by a metal bar, preferably a steel bar, provided with at least one through recess extending from outside of the metallurgical vessel as far as to within the metallurgical vessel, as well as to a process for producing a bottom anode and a process for operating a metallurgical vessel equipped with a bottom anode according to the invention.

2. Description of the Related Art

In order to maintain a direct current flow inducing an electric arc, one or several bottom anodes are arranged on the bottom of a metallurgical vessel, such as a direct current electric arc furnace, and are connected with the rectifier unit in a conductive manner.

Several types of bottom anodes have been known, their service lives, as a rule, ranging between some hundred to a maximum of about 1,500 melts. Thus, this service life lies considerably below the service life of the lining of a metallurgical vessel, which is made of refractory material. As a result, known bottom anodes must be replaced several times during the service life of the lining of a metallurgical vessel, which constitutes problems in respect of the procedure as such, the operational interruption involved and the connection of the bottom anode with the refractory lining of the metallurgical vessel. A widespread type of bottom electrode is the water-cooled billet or bloom anode, which is known, for instance, from DE-A-38 35 785 and from EP-A-0 133 925. In that case, one or several, suitably water-cooled, steel billet(s) or bloom(s) is/are inserted in the refractory lining of a brickwork of the metallurgical vessel and serve to transmit current to the melting stock. In the lower part of the billet or bloom anode, a copper bar is attached to the upper steel bar, which copper bar is intensively cooled with water and carries off heat, thus safeguarding a certain period of operation of the steel bar for the transmission of current to the melting stock.

However, during operation the refractory material around the anode bar is being washed out by the steel melt, the steel bar, thus, being worn, too. If such wear has reached a certain extent, the bottom anode must be replaced. This involves the drawbacks described above.

From EP-A-0 527 363, a bottom anode for an electric arc furnace of the initially defined kind is known, with which an electrode is integrated in a refractory ceramic body, thus forming a type of a flushing electrode. Thereby, the supply of flush gas, such as oxygen or inert gas, is to be ensured. In fact, such a flushing electrode is comprised of a central bar-shaped electrode that is surrounded by a steel tube concentrically and in a spaced-apart manner, the steel tube being enclosed by a refractory ceramic body. The flush gases are introducible through the annular gap provided between the steel tube and the electrode. According to another embodiment, the electrode itself incorporates gas channels for feeding a treatment gas. It is true that some kind of cooling effect of the bottom anode may be achieved by the flush gas injected, yet no decisive increase in its service life will be obtained thereby.

SUMMARY OF THE INVENTION

The present invention aims at avoiding these disadvantages and difficulties and has as its object to provide a bottom anode whose service life is substantially increased as compared to the service lives of known bottom anodes, conforming to that of a lining made of refractory material as closely as possible. Preferably, durabilities ranging from 4,000 to 8,000 melts are to be achieved.

In accordance with the invention, this object is achieved in that the bottom anode, on the vessel internal-side end of the metal bar, is provided with a nose formed of metal melt produced within the vessel and incorporating channels, which channels depart from the vessel internal-side end of the through recess of the metal bar, which is connected to a supply duct introducing liquid and/or solid hydrocarbons, and at least some of which channels reach as far as to the surface of the nose.

Such a nose is formed by the cracking processes occurring at the introduction of hydrocarbons into the melt and inducing a strong local cooling effect. Thus, melt produced within the metallurgical vessel solidifies at the vessel internal-side end of the metal bar, the solidified melt being porous, i.e., incorporating channels or passages through which the hydrocarbons fed to the bottom anode may exit into the melt even after formation of the nose so that they will, again, induce cracking processes on the surface of the nose, which are responsible for maintaining the nose, i.e., for preventing the same from melting off. The size (thickness and diameter) of the nose depends on the equilibrium adjusting on account of the heat supplied by the melt, which causes the nose to melt, and the cooling effect induced by the cracking processes.

Preferably, the nose has a convex shape, in particular, a mushroom-cap-like shape. Such a configuration develops, in particular, if the through recess(es) rather are /is close to the center of the metal bar of the bottom anode.

Preferably, the nose rises peripherally beyond the vessel internal-side front face of the metal bar of the bottom anode, contacting a refractory lining surrounding the metal bar. The extent of the peripheral projection may be adjusted as a function of the amount and the pressure of the hydrocarbons supplied.

An embodiment of the bottom anode that has proved particularly successful in practice is characterized in that the through recess is formed by a bore having circular cross section, into which a rod having polygonal cross section, in particular, that of a regular hexagon, is inserted, whose longitudinal edges lie at the wall of the bore, the bore advantageously having a diameter ranging from 10 to 40 mm. Thereby, the fine distribution of the hydrocarbons and hence an advantageous shape of the nose are ensured.

In this case, the cross sectional clearance area for passage suitably amounts to 10 to 50% of the cross sectional area of the bore.

According to a preferred embodiment suitable, in particular, for bottom anodes having large cross sections, a plurality of through recesses is provided.

Preferably, the through recess is connected to a supply duct feeding inert gas. In this case, a control station suitably is provided for controlling the ratio of hydrocarbon/inert gas.

A process for producing a bottom anode according to the invention is characterized in that a bottom anode formed by a metal bar and having at least one through recess connected to a supply duct feeding liquid and/or gaseous hydrocarbons is inserted into the metallurgical vessel, and liquid and/or gaseous hydrocarbons are introduced into the interior of the metallurgical vessel through the through recess during the production of a metal melt, wherein the hydrocarbons are cracked upon contact with the metal melt, thus causing strong local cooling inducing the formation of a solid nose of metal melt produced within the metallurgical vessel.

As mentioned above, the size of the nose may be adjusted as a function of the intensity of local cooling. The latter, in turn, is adjusted to the desired extent by mixing the supplied hydrocarbons with inert gas.

The minimal pressure of the supplied hydrocarbons that is required for the formation of the nose is 2 bars, preferably more than 3 bars.

A process for operating a metallurgical vessel equipped with a bottom anode according to the invention is characterized in that liquid and/or gaseous hydrocarbons as well as, if desired, additionally inert gas are introduced into the interior of the metallurgical vessel through the through recess and the channels of the nose during the production of a metal melt, i.e., from the beginning of charging until tapping.

If the supply of hydrocarbons is stopped, the heat of the melt will cause the nose to melt off and, as a result, the wear phenomena described in the introductory part of this description would appear at the bottom anode and at the refractory lining surrounding the same.

Suitably, the hydrocarbons are supplied to the through recess at a pressure of at least 2 bars, preferably of at least 3 bars, during operation of the metallurgical vessel.

BRIEF DESCRIPTION OF THE DRAWINGS

In the following, the invention will be explained in more detail with reference to the accompanying schematic drawing, wherein:

FIG. 1 schematically illustrates a section through the bottom of a metallurgical vessel at the location of a bottom anode;

FIG. 2 is a cross-sectional view through the bottom anode along line II—II of FIG. 1;

FIG. 3 depicts a detail of FIG. 2 on an enlarged scale, and

FIG. 4 represents another embodiment of the bottom anode in an illustration analogous to FIG. 2.

DETAILED DESCRIPTION OF THE PREFERRED EMBODIMENTS

A bottom anode 1 is inserted in the lining 2 made of refractory material of a metallurgical vessel whose outer jacket is not illustrated in detail. The bottom anode 1 is comprised of a metal bar 3, preferably of steel, which extends as far as to the internal surface 4 of the bottom of the refractory lining 2, and of a copper bar 5 following upon the same on the external side of the vessel and projecting outwards, which is provided with an intensive water cooling. Coolant connections 6, 7 serve to supply and discharge cooling water. The copper bar, furthermore, is provided with the necessary current connections 8.

According to the embodiment illustrated in FIGS. 1 and 2, a through recess 9 centrally passes both through the copper bar 5 and through the metal bar 3. On the bottom anode external-side end 10, a supply duct 11 supplying liquid or gaseous hydrocarbons follows upon the through recess 9, into which supply duct a further supply duct 12 feeding inert gas runs. Both supply ducts 11, 12 are provided with nonreturn valves 13. The ratio of the amount of inert gas to that of hydrocarbons is adjustable via a measuring and control station 14.

According to the exemplary embodiment illustrated (cf. FIG. 3), the through recess 9 is formed by a circular bore having a diameter ranging between 10 and 40 mm. This diameter depends on the cross sectional area of the metal bar 3, or on the diameter of a circle equal in area calculated from the cross sectional area, respectively. A rod 15 having the cross section of a regular polygon - according to the exemplary embodiment illustrated having the cross section of a regular hexagon - is inserted in this bore 9, the wall 16 of the bore forming a cylinder contacting the edges 17 of the hexagonal rod 15. Through the six circular segments 18 thus formed, hydrocarbon, if desired admixed with inert gas, is supplied to the interior of the metallurgical vessel. The cross sectional area passed by hydrocarbons preferably amounts to 10 to 50% of the cross sectional area of the bore.

A nose 19 of solidified metal melt 20 produced within the metallurgical vessel melts to the vessel internal-side end of the metal bar 3 and is traversed by fine channels 21 departing from the vessel internal-side mouth 22 of the through recess 9 and reaching as far as to the surface 23 of the nose 19. The nose is configured like the cap of a mushroom, the largest diameter 24 being larger than the diameter 25 of the metal bar 3 such that the mushroom-cap-shaped nose 19, by the rim region of the lower side of the mushroom cap, contacts the lining 2 of refractory material surrounding the bottom anode 1.

The bottom anode 1 functions in the following manner:

By introducing hydrocarbons into the metal melt 20 through the through recess 9, a strong local cooling effect is created on the vessel internal-side end 22 of the through recess 9, caused by the cracking of gaseous or liquid hydrocarbons or mixtures of gaseous hydrocarbons and inert gases when contacting the metal melt 20. As a result, the melt 20 contained in the metallurgical vessel solidifies in the region about the end 22 of the through recess 9. The metal melt 20 solidifies in a porous manner and in the form of a mushroom cap, the size of the mushroom-cap-shaped nose 19 being dependent on the equilibrium of the cooling effect occurring at the cracking procedure and the heat supplied by the metal melt 20. A mushroom-cap-shaped nose 19 of sufficient size will form at a high pressure of the hydrocarbons supplied. This is to be approximately 3 bars at least.

According to the embodiment illustrated in FIG. 4, four through recesses 9 are provided in the bottom anode 1. This is suitable, in particular, with bottom anodes having large diameters 25.

The invention is not limited to the exemplary embodiments illustrated, but may be modified in various aspects. Thus, it is, for instance, possible to arrange several bottom anodes 1 of the type according to the invention in a direct-current electric arc furnace for the production of steel, wherein the cross sections of these bottom anodes 1 may be round or polygonal. The diameter of a round bottom anode 1 suitably ranges between 80 and 500 mm. If a bottom anode having a polygonal cross section is provided, its cross-sectional area is to correspond to the cross sectional areas defined by the diametrical data indicated above.

The cross sectional clearance of the through recess also may be formed by rod-shaped inserts having cross sections constituted by polygons other than a regular hexagon. The cross sections of the inserted rods, for instance, also might be round, such an inserted rod being centrally retainable by ribs in a through recess 9 designed as a bore.

What we claim is:

1. A bottom anode arrangement for a metallurgical vessel for producing a metal melt comprising:

a bottom anode formed by a metal bar, having a vessel internal-side end and provided with at least one through recess extending from outside of said metallurgical vessel as far as to within said metallurgical vessel;

a nose formed on said bottom anode on said vessel internal-side end of said metal bar, said nose being formed of metal melt produced within said metallurgical vessel, said nose having a nose surface and incorporating channel means departing from the vessel internal-side end of said through recess of said metal bar, at least some of said channel means reaching as far as to said nose surface; and a supply duct connected to said through recess of said metal bar and adapted to supply at least one of liquid and solid hydrocarbons to said metallurgical vessel through said through recess.

2. A bottom anode arrangement as set forth in claim 1, wherein said nose has a convex shape.

3. A bottom anode arrangement as set forth in claim 2, wherein said nose has a mushroom-cap-shaped configuration.

4. A bottom anode arrangement as set forth in claim 1, further comprising a refractory lining surrounding said metal bar and wherein said metal bar of said bottom anode has a vessel internal-side front face and said nose peripherally rises beyond said vessel internal-side front face, contacting said refractory lining.

5. A bottom anode arrangement as set forth in claim 1, wherein said through recess is formed by a bore having a bore wall defining a circular cross section, and which further comprises a rod inserted in said bore, said rod having a polygonal cross section and longitudinal edges lying at said bore wall.

6. A bottom anode arrangement as set forth in claim 5, wherein said rod has a cross section in the form of a regular hexagon.

7. A bottom anode arrangement as set forth in claim 5, wherein said bore has a diameter ranging from 10 to 40 mm.

8. A bottom anode arrangement as set forth in claim 5, wherein said bore has a bore cross sectional area and a cross sectional clearance area for passage amounting to 10 to 50% of said bore cross sectional area.

9. A bottom anode arrangement as set forth in claim 1, wherein said bottom anode comprises a plurality of through recesses.

10. A bottom anode arrangement as set forth in claim 1, further comprising an inert gas supplying duct connected to said through recess.

11. A bottom anode arrangement as set forth in claim 10, further comprising a control station for controlling the ratio of said hydrocarbons to said inert gas.

12. A process for producing a bottom anode for a metallurgical vessel for producing a metal melt, which process comprises the steps of:

forming a bottom anode of a metal bar having a vessel internal-side end, said bottom anode having at least one through recess extending from outside of said metallurgical vessel as far as to within said metallurgical vessel and connected to a supply duct means supplying at least one of liquid and gaseous hydrocarbons;

inserting said bottom anode into said metallurgical vessel;

introducing said at least one of liquid and gaseous hydrocarbons through said at least one through recess into the interior of said metallurgical vessel during production of said metal melt; and inducing the formation of a solid nose of metal melt producing in said metallurgical vessel on said bottom anode on said vessel internal-side end of said metal, said solid nose being formed by said hydrocarbons cracking upon contact with, and having a local cooling effect on, said metal melt, said solid nose having a nose surface and incorporating channel means departing from said vessel internal-side end of said through recess of said metal bar and at least some of said channel means reaching as far as to said nose surface.

13. A process as set forth in claim 12, further comprising adjusting the intensity of said local cooling effect by mixing with inert gas said hydrocarbons supplied.

14. A process as set forth in claim 12, wherein said hydrocarbons are supplied to said through recess at a pressure of at least 2 bars.

15. A process as set forth in claim 12, wherein said hydrocarbons are supplied to said through recess at a pressure of at least 3 bars.

16. A process for operating a metallurgical vessel for producing a metal melt and equipped with a bottom anode formed of a metal bar having a vessel internal-side end, said bottom anode being provided with at least one through recess extending from outside of said metallurgical vessel as far as to within said metallurgical vessel and connected to a supply duct means, the process comprising the steps of:

supplying at least one of liquid and gaseous hydrocarbons from said supply duct means through said at least one through recess; and inducing formation of a solid nose being formed of metal melt produced in said metallurgical vessel, on said bottom anode on said vessel internal-side end of said metal bar, said solid nose having a nose surface and incorporating channel means formed by said hydrocarbons being cracked upon contact with said metal melt thus causing a strong local cooling effect inducing the formation of said nose, said channel means departing from said vessel internal-side end of said through recess of said metal bar and at least some of said channel means reaching as far as to said nose surface;

wherein said at least one of liquid and gaseous hydrocarbons being supplied through said at least one through recess of said bottom anode and through said channel means of said solid nose into the interior of said metallurgical vessel is introduced while producing said metal melt, from the beginning of charging until tapping.

17. A process as set forth in claim 16, further comprising the step of introducing inert gas through said at least one through recess of said bottom anode and through said channel means of said solid nose into the interior of said metallurgical vessel while producing said metal melt.

18. A process as set forth in claim 16, wherein said hydrocarbons are supplied to said through recess at a pressure of at least 2 bars.

19. A process as set forth in claim 16, wherein said hydrocarbons are supplied to said through recess at a pressure of at least 3 bars.

* * * * *